US012717314B2

(12) United States Patent
Oh et al.

(10) Patent No.: US 12,717,314 B2
(45) Date of Patent: Aug. 25, 2026

(54) LOCATION TRACKING SYSTEM IN FACTORY AND METHOD THEREOF

(71) Applicants: Hyundai Motor Company, Seoul (KR); Kia Corporation, Seoul (KR); Hyundai AutoEver Corp., Seoul (KR)

(72) Inventors: Seungryul Oh, Seoul (KR); Minoh Heo, Seoul (KR); JaeYong Park, Seoul (KR); Nulee Song, Seoul (KR)

(73) Assignees: Hyundai Motor Company, Seoul (KR); Kia Corporation, Seoul (KR); Hyundai AutoEver Corp., Seoul (KR)

( * ) Notice: Subject to any disclaimer, the term of this patent is extended or adjusted under 35 U.S.C. 154(b) by 420 days.

(21) Appl. No.: 18/345,691

(22) Filed: Jun. 30, 2023

(65) Prior Publication Data

US 2024/0012394 A1 Jan. 11, 2024

(30) Foreign Application Priority Data

Jul. 5, 2022 (KR) ........................ 10-2022-0082374

(51) Int. Cl.
*G05B 19/418* (2006.01)
*G06T 7/00* (2017.01)

(52) U.S. Cl.
CPC ........ *G05B 19/4185* (2013.01); *G06T 7/0004* (2013.01); *G05B 2219/45018* (2013.01)

(58) Field of Classification Search
CPC ...... G05B 19/4185; G05B 2219/45018; G06T 7/0004
USPC ........................................................... 700/96
See application file for complete search history.

(56) References Cited

U.S. PATENT DOCUMENTS

| | | | | |
|---|---|---|---|---|
| 2013/0329950 A1* | 12/2013 | Yang | G06V 10/803 | 382/103 |
| 2018/0143637 A1* | 5/2018 | Tian | G05D 1/0094 | |
| 2020/0333789 A1* | 10/2020 | Suzuki | G05D 1/0212 | |
| 2020/0358863 A1* | 11/2020 | Ichikawa | G06T 7/246 | |
| 2020/0389601 A1* | 12/2020 | Boyless | H04N 23/60 | |
| 2022/0058826 A1* | 2/2022 | Hasegawa | B65G 1/137 | |
| 2022/0174240 A1* | 6/2022 | Hseush | G06F 16/53 | |
| 2022/0366599 A1* | 11/2022 | Okada | G06T 7/246 | |
| 2023/0030596 A1* | 2/2023 | Kim | G06T 7/277 | |
| 2025/0264878 A1* | 8/2025 | Dean | G05D 1/81 | |

OTHER PUBLICATIONS

Garrido-Jurado et al., “Automatic generation and detection of highly reliable fiducial markers under occlusion,” Pattern Recognition, Jun. 2014, 47(6):14 pages.

(Continued)

*Primary Examiner* — Md Azad
(74) *Attorney, Agent, or Firm* — Fish & Richardson P.C.

(57) ABSTRACT

A location tracking system includes a plurality of markers disposed on a fixture in an area having an absolute coordinate in the factory, an image collecting device fixedly attached to a tracking target for management, configured to recognize an absolute location of a reference marker detected by a visual odometry (VO) method in an image captured by a camera, and estimate a relative location based on the absolute location of the reference marker; and a server configured to track a location of the target based on the relative location received through a wireless communication from the image collecting device.

19 Claims, 6 Drawing Sheets

(56) References Cited

OTHER PUBLICATIONS

Garrido-Jurado et al., "Generation of fiducial marker dictionaries using mixed integer linear programming," Pattern Recognition, Mar. 2016, 51:14 pages.

Lepetit et al., "EPnP: Accurate Non-Iterative O(n) solution to the PnP problem," International Journal of Computer Vision, Feb. 2009, 22 pages.

* cited by examiner

LOCATION TRACKING SYSTEM IN FACTORY AND METHOD THEREOF

CROSS-REFERENCE TO RELATED APPLICATION

This application claims priority to and the benefit of Korean Patent Application No. 10-2022-0082374 filed in the Korean Intellectual Property Office on Jul. 5, 2022, the entire contents of which are incorporated herein by reference.

TECHNICAL FIELD

The present disclosure relates to a location tracking system in a factory and method thereof, and more particularly, to a location tracking system and method thereof for tracking a real-time location of a tracking target in a factory.

BACKGROUND

An automobile manufacturing factory typically employs a range of processes to assemble vehicle products. Within these processes, the assembly of individual vehicles, identified by their Vehicle Identification Number(VIN), takes place. The factory ensures that parts corresponding to specific specifications are utilized during this assembly stage. In addition, the factory manages production by ensuring the timely supply of parts to their designated locations within each process.

Conventionally, as a part of production management, the indoor whereabouts of vehicles have been monitored. For example, smart tag-type terminals, equipped with ability to connect to short-range wireless repeaters or Access Points (APs) strategically placed throughout the factory, are attached to vehicles. By employing a triangulation method involving the connected Aps, the indoor positions of the vehicles can be determined.

However, the conventional method of location tracking can require a substantial deployment and management of a large number of APs within the factory. This results in escalated infrastructure costs and maintenance costs.

In addition, within a factory setting, the conventional employment of Impulse Radio (IR), Ultra-wideband (UWB), and Time Difference of Arrival (TDoA) methods for location tracking encounters limitations. These methods tend to exhibit relatively high accuracy in spaces with minimal structures where multipath radio signal interference is minimal. However, in environments abundant with structures, such as a vehicle factory, the accuracy of location tracking diminishes, posing a challenge.

SUMMARY

The present disclosure is directed to a location tracking system in a factory and method thereof capable of recognizing an absolute location of the marker attached to the fixture indoor by processing the image taken around the surroundings through an image collecting device individually attached to the tracking target (e.g., a vehicle) managed by a factory, and estimating a relative location of the target from the absolute location of the marker using a Visual Odometry (VO) algorithm.

According to one aspect of the present disclosure, a location tracking system in a factory can include a plurality of markers disposed on a fixture in an area having an absolute coordinate in the factory; an image collecting device fixedly attached to a tracking target for management, configured to recognize an absolute location of a reference marker detected by a visual odometry (VO) method in an image captured by a camera, and estimate a relative location based on the absolute location of the reference marker; and a server configured to track a location of the target based on the relative location received through a wireless communication from the image collecting device.

The image collecting device may include: a camera unit configured to photograph surroundings of the target through at least one camera; an Inertial Measurement Unit (IMU) configured to derive an inertia value including an acceleration and a moving direction of the target; a location tracking unit configured to recognize an absolute location of the reference marker fixed indoor by analyzing a video collected through the camera unit and estimate a relative location from the absolute location; a communication unit configured to transmit the relative location to the server through a wireless communication; a memory configured to store at least one program and data for operating the image collecting device; a power supply unit including at least one of a cable connector and a secondary battery capable of charging and discharging; and a control unit configured to execute a program for tracking a location of the target and control an overall operation of each unit.

The location tracking may query the memory based on a marker code derived from a geometric shape of the reference marker to recognize an absolute position fixed on a coordinate system in the factory and a marker direction toward which a plane of the reference marker is facing.

The location tracking unit may estimate the relative location spaced apart at a certain angle and a distance based on an absolute coordinate and a marker direction of the reference marker.

The location tracking unit may analyze the video and extract clear image data and orientation data among a plurality of frames.

The estimating the relative position by the image collecting device may include: detecting the reference marker exists in the image data by performing an image processing-based feature detection on the image data extracted from the video; recognizing a predefined marker code by reading a geometric shape of the reference marker; and estimating a relative location of the tracking target from an absolute location of the reference marker.

The detecting the reference marker by the image collecting device may include: determining whether the reference marker exists in the image data by performing an image processing-based feature detection on the image data; binarizing the image data based on a predefined threshold value when the reference marker exists in the image data; detecting a square-shaped marker candidate in the binarized image; and selecting a marker candidate which is the largest and having the least distortion as the reference marker when a plurality of marker candidates are detected.

The recognizing the marker code by the image collecting device may include: restoring a distorted shape of the reference marker into a square; forming a grid of equal intervals according to the number of bits of markers defined in advance; reading white or black after generating a median value in the grid, to extract a bit value of geometric shape marked on the reference marker; querying the memory whether the bit value exists in a predefined marker dictionary; and outputting the recognized marker code if the bit value exists, or determining to be invalid if the bit value does not exist.

The estimating the relative position by the image collecting device may include: generating a marker coordinate system for estimating the relative location based on an absolute coordinate and a marker direction of the reference marker, and the generating the marker coordinate system may include: figuring out coordinates of 4 vertices and lengths of 4 sides of a square border of the reference marker; and generating the marker coordinate system having an X axis and a Y axis using a square edge of the reference marker, the X axis and the Y axis being orthogonal at a center of a plane of the square, equal to two sides orthogonal to a Z axis in a vertical direction from the center of the plane.

The image collecting device may store estimation results of continuously and stably detected reference marker according to conditions set to correct an error occurring by a size of the reference marker and a degree of distortion, and correct an actual estimated location and moving direction by considering moving direction of a point group of collection of points of the stored coordinates.

The image collecting device may estimate a current relative location by performing a Motion Estimation based on the last known relative location and an inertia value provided from the IMU, if the reference marker is not detected in the image data.

The target may include at least one of a product vehicle that are assembled while moving by process along a conveyor system, a logistics robot that supplies necessary parts for each process, a moving truck for loading the parts, and a tool that is movable for each process.

The server may determine facility devices for each process based on a model and specification of the vehicle and an estimated location, control an execution of process works, and receive and updates a work result.

According to one aspect of the present disclosure, a location tracking method in a factory of an image collecting device fixedly attached to a tracking target for management can include collecting an image data of surroundings captured while moving through a camera unit; deriving an inertia value by measuring an acceleration and a moving direction through an IMU; detecting whether a reference marker disposed on a fixture in an area having absolute coordinates in the factory exists in the image data through a location tracking unit; and if the reference marker is detected, reading a geometric shape the reference marker, recognizing an absolute location and a marker direction of the reference marker defined in advance, and estimating a relative location of the tracking target based on an absolute position and a marker direction of the reference marker.

The detecting whether the reference marker exists may include: determining whether the reference markers are continuously and stably detected in accordance with conditions set in a plurality of image data; and determining a reference marker to be invalid and excluding the reference marker from an analysis when the reference marker is not continuously and stably detected the conditions may determine that a continuous and stable detection is performed when: in a state where a reference marker is detected by processing the plurality of image data in a same way, if all the conditions that marker codes of continuously detected reference markers are the same, a number of pixels occupying an area of the reference marker is greater than a specific value, and a change in a number of pixels continuously exists are satisfied.

The location tracking method may further include: estimating a current relative location by performing a Motion Estimation based on the last known relative location and the inertia value, if a reference marker which exists in the image data is not detected, after the detecting whether the reference marker exists.

The location tracking method may further include: transmitting a relative location information of the target to a server, and updating a tracking location of the target, after the estimating the relative location.

The relative location information may include at least one of a image collecting device, a marker code, a relative coordinate with respect to a reference marker, a moving direction, an image data, and an orientation data.

DETAILED DESCRIPTION

It is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

A location tracking system and method thereof will hereinafter be described in detail with reference to the accompanying drawings.

Figure 1:
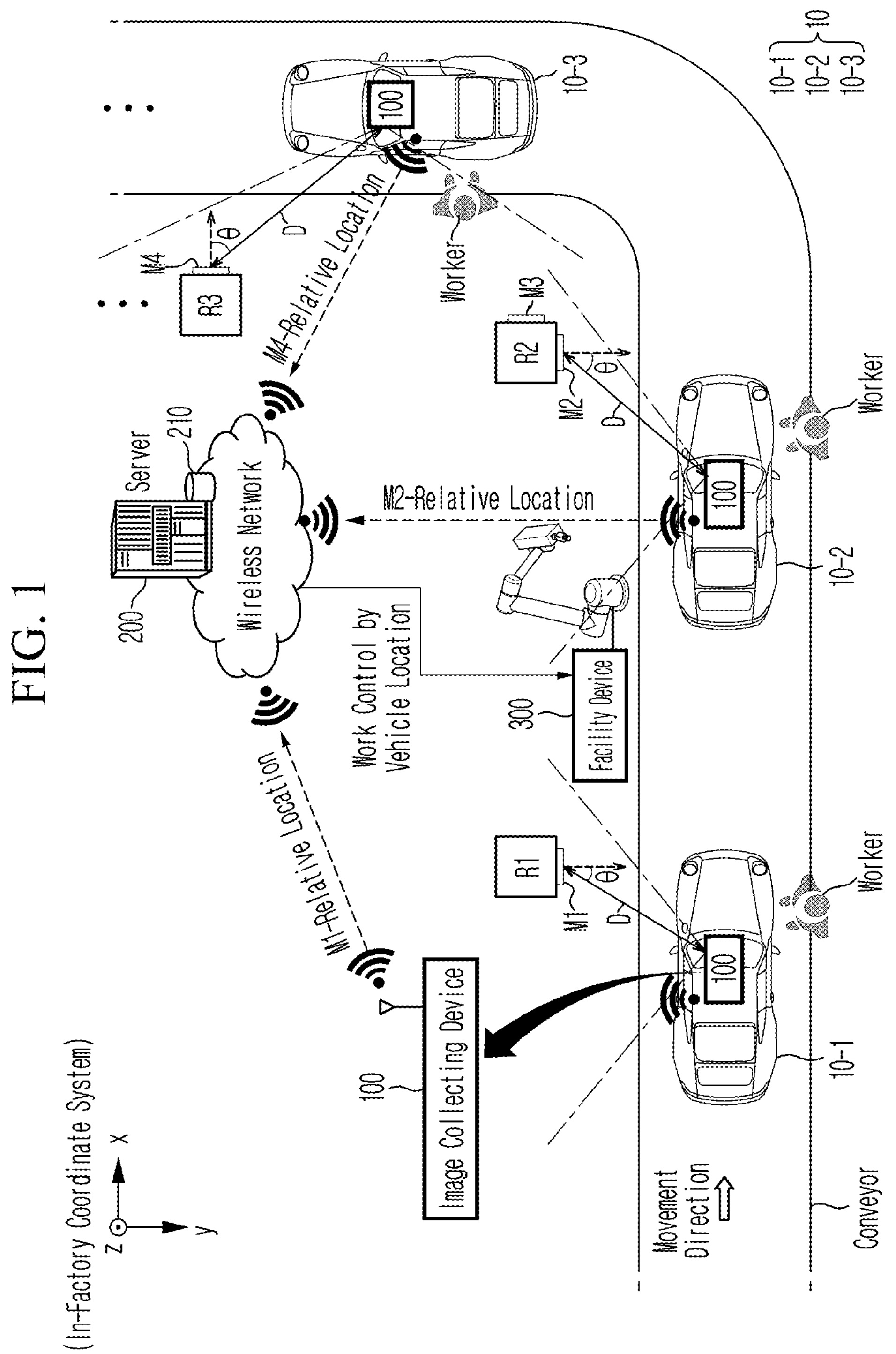
FIG. 1 is a diagram illustrating an example of a location tracking system in a factory.

FIG. 1 illustrates a location tracking system in a factory.

Figure 2:
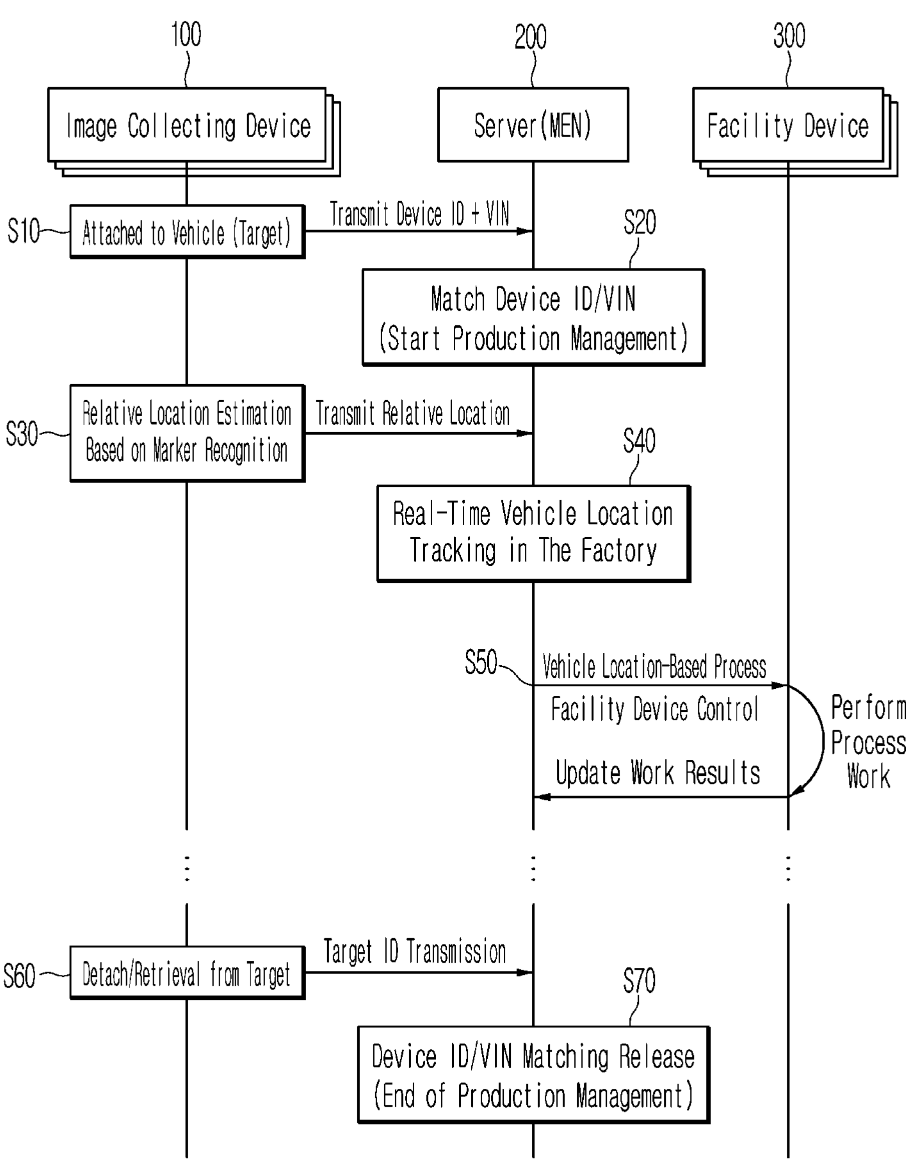
FIG. 2 is a flowchart schematically illustrating an example of a location tracking method for a target by a location tracking system in a factory.

FIG. 2 is a flowchart schematically illustrating a location tracking method for a target by a location tracking system in a factory.

Referring to FIG. 1 and FIG. 2, a location tracking system in a factory may include, a plurality of markers M attached (mounted) on a fixture R1, R2, R3 in an area having an absolute coordinate in the factory, an image collecting device 100 fixedly attached to a tracking target (or a target) (e.g., a vehicle) 10 for management, configured to recognize an absolute location of a reference marker M detected by a visual odometry (VO) method in an image captured by a camera, and estimate a relative location based on the absolute location of the reference marker M; and a server 200 configured to track a location of the target 10 based on the relative location received through a wireless communication from the image collecting device 100. Here, the relative location means a location of the image collecting device 100 as a 3D coordinate of a point on a coordinate system in the factory, or a location of the target 10 to which the imaging collecting device 100 is attached.

In step S10, the image collecting device 100 is temporarily fixedly attached (mounted) to the target 10 to be managed. For example, the target 10 may be a product vehicle that are assembled while moving by process along the conveyor system, a logistics robot (e.g., Automated Guided Vehicle/Autonomous Mobile Robot, AGV/AMR) that supplies necessary parts for each process, a moving truck for loading the parts, and a tool that is movable for each process.

Hereinafter, the target 10 will be described assuming that it is a "vehicle", which is a manufactured product, but the description of the a "vehicle" may be substantially replaced with a "target."

The image collecting device 100 may transmit its own device ID and the attached vehicle identification information (or vehicle identification number) VIN to the server 200 through wireless communication.

In step S20, the server 200 matches and stores the device ID and VIN received from the image collecting device 100, and starts production management for the vehicle 10.

Referring to FIG. 1, markers M1, M2, M3, and M4 are disposed on fixtures R1, R2, and R3 having fixed absolute coordinates near the conveyor system installed and operated in a vehicle factory. And, along the production line of the conveyor system, workers and facility devices 300 are located to perform a process operation. The fixtures R1, R2, and R3 may be pillars, walls, fixed signs, and so on in the factory. The markers M1, M2, M3, and M4 may be composed of ArUco markers in which identification codes are marked on a rectangular border including four corner points, and they may be attached to one surface of the fixture R. In addition, several markers M may be attached to one surface. The marker M is not limited to the ArUco marker and may be implemented as a QR code within a square border or by enlarging and displaying a barcode.

In step S30, the image collecting device 100 may move along the conveyor system while being attached to the individual vehicles 10-1, 10-2, and 10-3, and estimate its relative location with respect to the absolute location (3D coordinates) of the reference marker M recognized through the camera unit 110. Here, the absolute location may refer to a fixed absolute coordinate in the global coordinate system (3D) in the factory, and the relative location may refer to a relative coordinate spaced at a certain angle θ and distance D based on the absolute coordinates (x, y, z) of the reference marker M and its direction (i.e., the direction in which the marker M is directed; hereinafter referred to as the marker direction).

For example, in FIG. 1, the image collecting device 100 of the first vehicle 10-1 may estimate the relative location of the first marker M1 to the absolute location and transmits it to the server 200. Similarly, the image collecting devices 100 of the second vehicle 10-2 and the third vehicle 10-3 may estimate the relative locations of the second marker M2 and the fourth marker M4 to the absolute locations respectively, and transmit them to the server 200.

In step S40, when the server 200 receives the relative location from the image collecting device 100, it may check the VIN of the vehicle 10 matched thereto, and tracks and manages the real-time location of the vehicle 10 (S40).

Then, in step S50, the server 200 may determine facility devices 300 for each process based on the model and specification of the vehicle 10 and the current location, control the execution of the process work, and receive and update the work result.

The server 200 may be implemented as a Manufacturing Execution System (MES) that integrates and manages production of vehicles (products) and operation of facilities in the factory. Such a server 200 may perform integrated management of product production schedules and overall facilities in the factory, including production management based on the location tracking of the vehicle 10 transported for each process in the factory, operation management of the facility devices 300 for each process in consideration of the vehicle model and specification of the vehicle 10, and parts supply management for each process using logistics robots. In step S60, the image collecting device 100 may transmit detachment information from the finished vehicle 10 after use to the server 200 for production management of the vehicle 10. Even at this time, the device ID and the VIN of the detached vehicle may be transmitted to the server 200 through wireless communication.

Accordingly, in step S70, when the server 200 receives the detachment information from the image collecting device 100, the server 200 may cancel the matching between the device ID and the VIN of the vehicle and ends production management for the vehicle 10.

In this way, the image collecting device 100 is attached to an individual vehicle 10 to be managed in a factory, used, recovered from a vehicle that has completed production, and reused in another vehicle.

Figure 3:
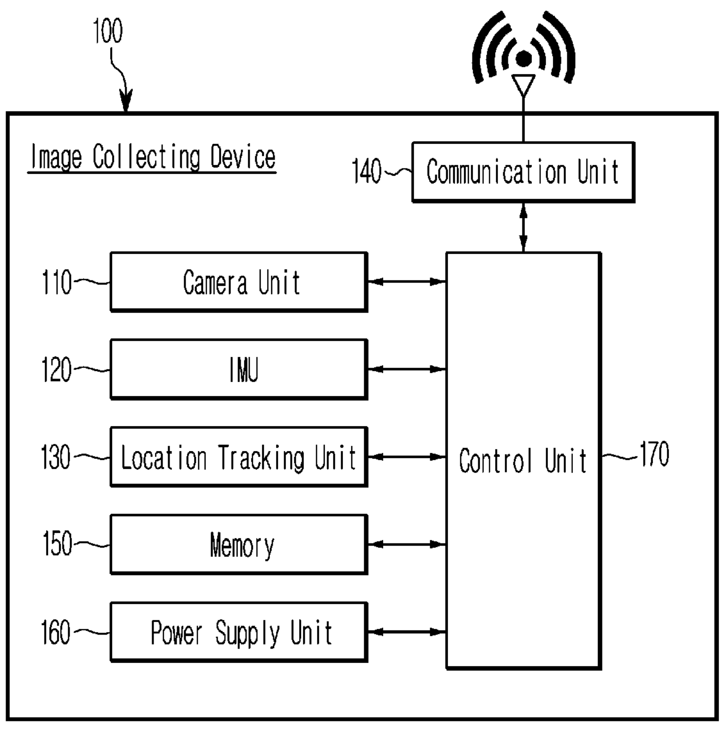
FIG. 3 is a block diagram schematically illustrating an example of an image collecting device.

FIG. 3 is a block diagram schematically illustrating an image collecting device.

Referring to FIG. 3, an image collecting device 100 includes a camera unit 110, an IMU 120, a location tracking unit 130, a communication unit 140, a memory 150, a power supply unit 160, and a control unit 170.

The camera unit 110 may photograph the surroundings of the target vehicle 10 through at least one camera. The camera unit 110 may include a stereo camera that acquires 3D spatial coordinates (x, y, z) using left and right images.

An Inertial Measurement Unit (IMU) 120 may measure an acceleration and a moving direction of the vehicle 10 through various sensors and derive an inertial value including the acceleration and the moving direction.

The location tracking unit 130 recognize the absolute location of the reference marker M fixed indoor by analyzing the video collected through the camera unit 110 and estimate a relative location of itself (i.e., the image collecting device) from the absolute location.

The location tracking unit 130 may query the memory 150 based on the marker code derived from the geometric shape of the reference marker M to recognize the absolute location and direction of the reference marker. Here, the absolute location may refer to a fixed 3D coordinate (i.e., installation position) on the in-factory coordinate system, and the direction of the marker may refer to a direction in which the plane of the reference marker M is facing at the installed location. The direction of the marker becomes a reference of the marker coordinate system 3D for determining in which direction (orientation) the vehicle 10 is located based on the absolute coordinates of the reference marker M later. The marker coordinate system will be described in detail later.

The location tracking unit 130 may obtain an image data by analyzing the video received from the camera unit 110 using a visual location tracking algorithm. For example, the location tracking unit 130 may analyze the video and extract clear image data and orientation data of optimal quality among a plurality of frames. The orientation data may include photographing direction and rotation information of the camera unit 110.

Figure 4:
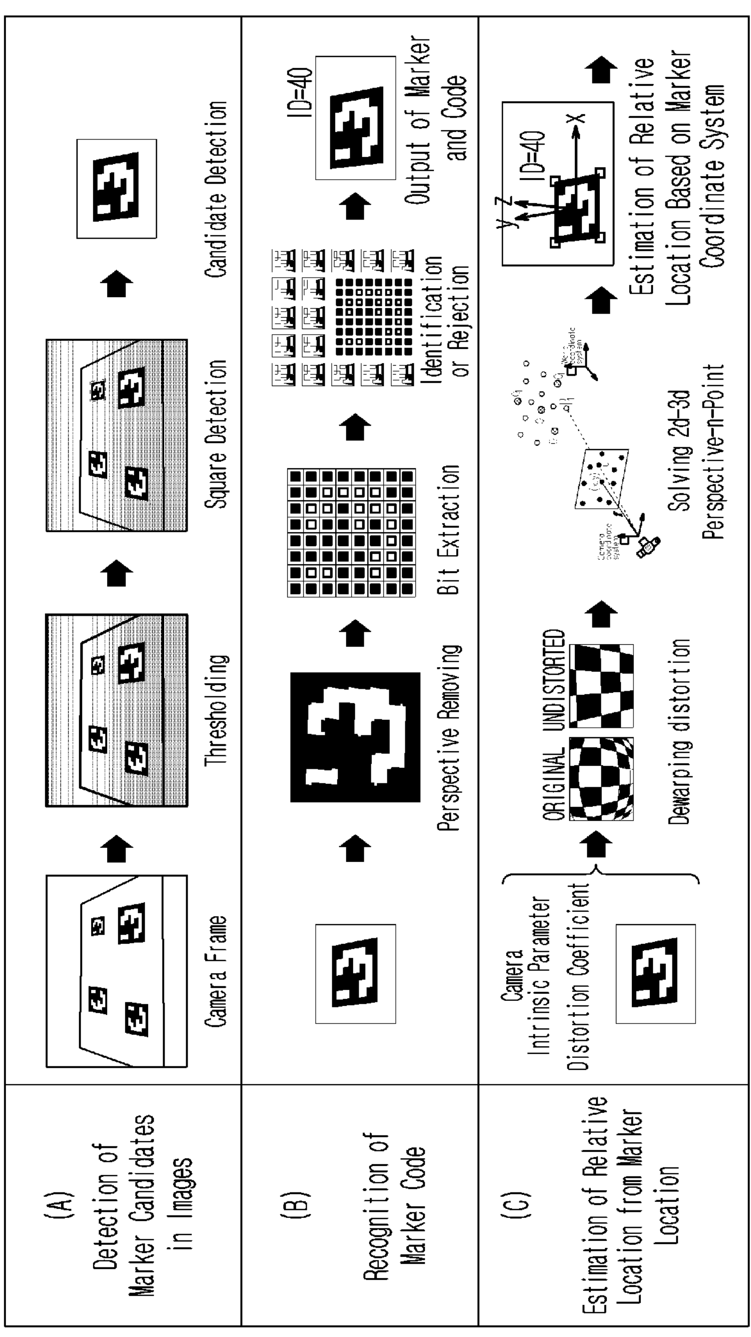
FIG. 4 is a diagram illustrating an example of an image data processing flow for specifically explaining a process of estimating a relative location.

FIG. 4 illustrates an image data processing flow for specifically explaining a process of estimating a relative location.

Referring to FIG. 4, a process of estimating a relative location may include, (A) detecting, by the location tracking unit 130, a reference marker M present in image data obtained from the camera unit 110; (B) recognizing a predefined marker code (ID) by reading the geometric shape of the reference marker M; and (C) estimating the relative location from the absolute location of the reference marker M.

First, the process (A) of detecting the reference marker M candidate will be described in detail.

The location tracking unit 130 may determine whether the reference marker M exists in the image data by performing an image processing-based feature detection on the image data. At this time, the location tracking unit 130 may perform binarizing the image data based on a predefined threshold value when the reference marker M exists in the image data; detecting a square-shaped marker candidate in the binarized image; and selecting a marker candidate which is the largest and having the least distortion as the reference marker when a plurality of marker candidates are detected.

Next, the process (B) of recognizing the marker code ID will be described in detail.

The location tracking unit 130 may extract and interpret the geometrical shape marked on the valid marker to recognize a corresponding marker code (e.g., ID=40), an absolute coordinate and a marker direction corresponding to the marker code. At this time, the marker code recognition process may include restoring the distorted shape of the valid marker M into a square; forming a grid of equal intervals according to the number of bits of markers defined in advance; reading white or black after generating the median value in the grid, to extract the bit value of the geometric shape marked on the reference marker M; and querying the memory 150 whether the bit value exists in a predefined marker dictionary; and outputting the recognized marker code if the bit value exists. However, if the bit value does not exist, it may be determined to be invalid and rejected.

Next, the process (C) of estimating the relative location will be described in detail.

The location tracking unit 130 may generate a marker coordinate system for estimating a relative location 3D spaced apart at a certain angle θ and a distance D based on the absolute coordinate and the marker direction of the reference marker M.

The generating the marker coordinate system may include figuring out the coordinates of the 4 vertices (e.g., (−L/2, L/2, 0), (L/2, L/2,0), (L/2, −L/2,0), (−L/2, −L/2,0)) and the lengths L of the 4 sides of the square border of the reference marker M; and generating the marker coordinate system (x, y, z) having an X axis and a Y axis using the square edge of the reference marker M, the X axis and the Y axis being orthogonal at the center of the plane, equal to the two sides orthogonal to a Z axis in the vertical direction from the center of the plane of the square (e.g., the absolute coordinate of the reference marker).

As described above, the location tracking unit 130 may continuously performs feature detection on the image data to determine a movement of the surrounding environment, and through this, it is possible to estimate a movement distance and a moving direction relative to the existing coordinate. However, such estimation may have an error depending on the angle θ and distance D at which the reference marker M is actually viewed, the size of the reference marker image, and the degree of distortion.

Therefore, the location tracking unit 130 may store the estimation results of the continuously and stably detected reference markers M according to the conditions set to correct the error, collect the points of the estimated coordinates, and correct the actual estimated location and moving direction by collecting points of the estimated coordinates and considering the overall moving direction of the point group.

Figure 5:
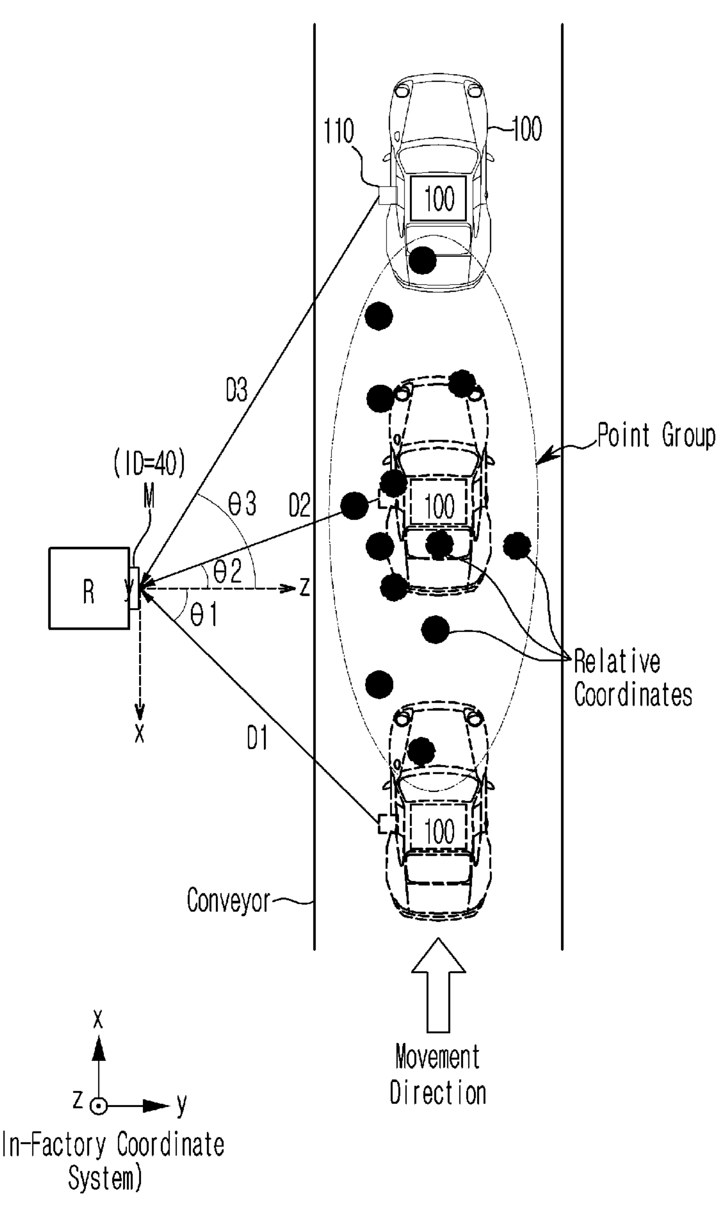
FIG. 5 is a diagram illustrating an example of a result of recognizing relative coordinates from markers.

For example, FIG. 5 illustrates a result of recognizing relative coordinates from markers.

Referring to FIG. 5, relative coordinates (e.g., 13 points) are shown which are estimated while reference markers M are continuously and stably detected from a plurality of image data collected in time series while the vehicle 10 is moving. Here, that the reference marker M is continuously and stably detected means that the following conditions are continuously satisfied.

The location tracking unit 130 may determine that, in a state where reference markers M are detected by processing a plurality of image data in the same way, if all the conditions that the marker codes ID of continuously detected reference markers M are the same, the number of pixels occupying the area of the reference marker M is greater than a specific value, and the change in the number of pixels continuously exists are satisfied, a continuous and stable detection is performed. The change in the number of pixels occurs because the square shape of the reference marker M is distorted as the photographing angles 81, 82, and 63 of the camera unit 110 change due to the movement of the vehicle 10.

The relative coordinates form a spread point group (distribution) because an estimation error may occur according to the viewing angle (θ) and the distance (D) based on the marker coordinate system. The actual estimated location and the moving direction are corrected in consideration of the overall moving direction of the relative coordinates forming the point group. To this end, the location tracking unit 130 may infer a main moving direction based on the first principal component vector through Principal Component Analysis (PCA). In addition, in order to correct the rotation direction on the VO algorithm, an angular difference between a vector obtained from only the x and y components of the marker coordinate system in the first principal component vector and the reference coordinates (1, 0, 0) is calculated, and the rotation matrix on the VO algorithm can be updated using this. This method may utilize a general VO algorithm.

On the other hand, if the reference marker M is not detected in the image data, the location tracker 130 may estimate the moved relative location 3D by performing a Motion Estimation based on the last known relative location and the inertia value provided from the IMU 120. That is, the relative position (3D) with respect to the reference marker M may be estimated in real time by estimating a motion vector from the last known relative location.

The communication unit 140 may transmit the relative location estimated by the location tracking unit 130 to the server 200 through wireless communication. The relative location may be transmitted in the form of a message including at least one of an image collecting device ID, a recognized marker code, a relative coordinate (3D) with respect to a reference marker M, a moving direction, an image data, and an orientation data.

The memory 150 may store at least one program and data for overall operation of the image collecting device 100, and store data generated according to the operation.

For example, the memory 150 may store videos collected by the camera unit 110, the image data obtained by processing the videos, and the orientation data.

In addition, the memory 150 may store a 3D map-based spatial coordinate system in the factory, absolute coordinates of reference markers M arranged on the coordinate system, a marker coordinate system, a marker recognition program, a marker image processing algorithm, and a VO algorithm.

The power supply unit 160 may include at least one of a cable connector connected to an external power source and a secondary battery capable of charging and discharging, and supply power for the operation of the image collecting device 100.

The control unit 170 may execute a program for tracking the location of a target in a factory to control the overall operation of each unit. Therefore, it should be understood that the operation of each unit described above is substantially operated by the control unit 170.

The control unit 170 may process the image data obtained from the camera unit 110 through the location tracking unit 130 to recognize the absolute location of the reference marker M attached to the fixture, and utilize the VO algorithm to estimate the relative location of the vehicle 10 from the absolute location of the reference marker M.

Then, the control unit 170 may transmit the estimated relative location to the server 200 through the communication unit 140 to support the location tracking of the target to be managed in the production factory.

The control unit 170 may be implemented with one or more processors that operate according to a set program, and the set program may be programmed to perform each step of the location tracking method for a target in a factory.

A location tracking method for a target in a factory will be described in more detail with reference to the drawings below.

Figure 6:
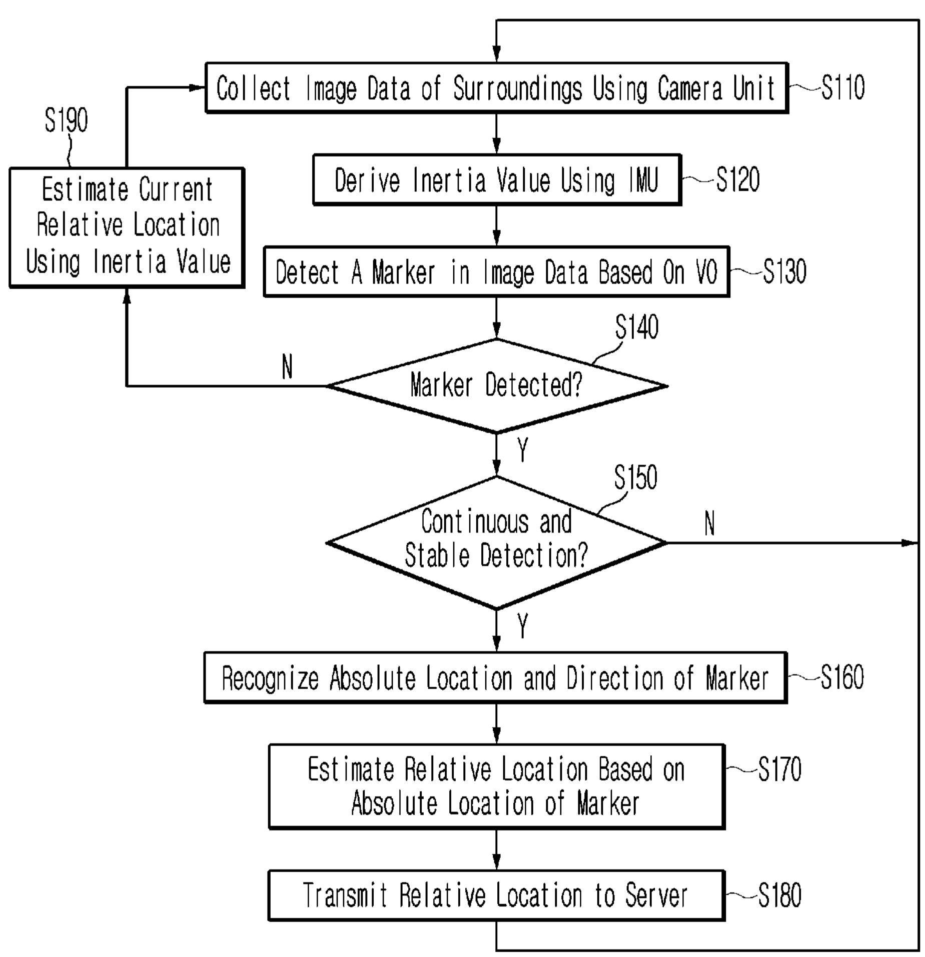
FIG. 6 is a flowchart schematically illustrating an example of a location tracking method for a target in a factory.

FIG. 6 is a flowchart schematically illustrating a location tracking method for a target in a factory.

Referring to FIG. 6, in step S30 of FIG. 2 described above, a flow in which the image collection device 100 estimates its relative location with respect to the absolute position (3D coordinates) of a specific reference marker M recognized through the camera unit 110 is specifically illustrated.

In step S110, the control unit 170 of the image collecting device 100 may collect image data of surroundings captured while moving through the camera unit 110.

In step S120, the control unit 170 may derive an inertia value including the vehicle 10 acceleration and the moving direction through the IMU 120.

In step S130, the control unit 170 may detect whether a reference marker M exists in the image data using a Visual Odometry (VO) based location estimation method through the location tracking unit 130.

At this time, when the reference markers M present in the image data are detected (S140; Y), in step S150, the control unit 170 may determine whether the reference markers M are continuously and stably detected in accordance with the conditions set in the plurality of image data.

At this time, if the reference markers M are continuously and stably detected (S150; Y), in step S160, the control unit 170 may read the reference marker M, recognizes the absolute location and the marker direction of the reference marker M defined in advance, and in step S170, the control unit 170 may estimate its own relative location based on the absolute position and direction of the reference markers M.

In step S180, the control unit 170 may transmit the relative location information of the vehicle 10 to the server 200 connected through wireless communication to update the tracking location of the vehicle. At this time, the transmitted relative location information may include at least one of the image collecting device ID, a marker code, a relative coordinate (3D) with respect to a reference marker, a moving direction, an image data, and an orientation data.

On the other hand, in step 130, when the reference markers M present in the image data is not detected (S140; N), in step S190, the control unit 170 may estimate the current relative position (3D) by performing a Motion Estimation based on the last recognized relative location and the inertia value provided from the IMU 120.

In addition, in step 150, when the reference markers M are not continuously and stably detected (S150; N), the control unit 170 may determine that the reference markers M are invalid, excludes them from an analysis, and proceeds to step S110.

As such, in some implementations, by providing an improved location tracking system capable of recognizing reference markers placed on fixtures through image collecting devices attached to tracking targets in factories and measuring relative locations from absolute locations of the reference markers, the AP used in the conventional location tracking method can be eliminated, and thus the investment and maintenance cost can be reduced.

In addition, since markers in the form of printed matter can be freely and simply arranged to the fixtures which are the fixed coordinate area in the factory in various directions, the location tracking accuracy of the target can be improved according to the improvement in the arrangement density of the markers.

Furthermore, there is an effect that can remove the multipath problem of the wireless signal due to the elimination of the AP used in the conventional location tracking method, and because there is no need to consider the installation location of the AP, it is possible to facilitate the work in the line configuration and design of the factory.

What is claimed is:

1. A location tracking system for a factory, comprising:

a plurality of markers configured to be disposed on a fixture in an area having an absolute coordinate in the factory;

an image collecting device that is coupled to a tracking target for management and that is configured to (i) recognize an absolute location of a reference marker detected by a visual odometry (VO) method in an image captured by a camera and (ii) estimate a relative location based on the absolute location of the reference marker; and a server configured to track a location of the target based on the relative location received through a wireless communication from the image collecting device, wherein the image collecting device is configured to transmit, to the server, a device ID and vehicle identification information, wherein the server is configured to:

match and store the device ID and the vehicle identification information received from the image collecting device, start production management for the vehicle, determine facility devices for each production process based on a model and specification of the vehicle and a current location, control execution of one or more production process operations using the determined facility devices, and receive and update production process result information, wherein the image collecting device is configured to transmit detachment information from the finished vehicle after use to the server, and wherein the server is configured to:

receive the detachment information from the image collecting device, cancel the matching between the device ID and the vehicle identification information of the vehicle, and end production management for the vehicle.

2. The location tracking system of claim 1, wherein:

the image collecting device comprises:

at least one camera configured to photograph surroundings of the target, an Inertial Measurement Unit (IMU) configured to derive an inertia value including an acceleration and a moving direction of the target, a location tracking unit configured to recognize the absolute location of the reference marker by analyzing a video collected through the at least one camera and estimate the relative location from the absolute location, a communication unit configured to transmit the relative location to the server through a wireless communication, a memory configured to store at least one program and data for operating the image collecting device, a power supply including at least one of a cable connector and a secondary battery, and a controller configured to execute a program stored in the memory for tracking a location of the target and control an operation of components of the image collecting device.

3. The location tracking system of claim 2, wherein:

the location tracking unit is configured to query the memory based on a marker code derived from a geometric shape of the reference marker to recognize an absolute position fixed on a coordinate system in the factory and a marker direction toward which a plane of the reference marker is facing.

4. The location tracking system of claim 3, wherein:

the location tracking unit is configured to estimate the relative location spaced apart at a certain angle and a distance based on an absolute coordinate and a marker direction of the reference marker.

5. The location tracking system of claim 3, wherein:

the location tracking unit is configured to analyze the video and extract image data and orientation data among a plurality of frames of the analyzed video.

6. The location tracking system of claim 5, wherein:

estimating the relative location by the image collecting device comprises:

detecting the reference marker in the image data by performing an image processing-based feature detection on the image data extracted from the video, recognizing a predefined marker code by reading a geometric shape of the reference marker, and estimating a relative location of the tracking target from an absolute location of the reference marker.

7. The location tracking system of claim 6, wherein:

detecting the reference marker by the image collecting device comprises:

determining whether the reference marker exists in the image data by performing the image processing-based feature detection on the image data, based on a determination that the reference marker exists in the image data, binarizing the image data based on a predefined threshold value, detecting a square-shaped marker candidate in the binarized image data, and based on a plurality of marker candidates being detected, selecting a marker candidate, which is the largest and having the least distortion, as the reference marker.

8. The location tracking system of claim 6, wherein:

recognizing the marker code by the image collecting device comprises:

restoring a distorted shape of the reference marker into a square, forming a grid of equal intervals according to a number of bits of markers defined in advance, reading white or black after generating a median value in the grid, to extract a bit value of geometric shape marked on the reference marker, querying the memory whether the bit value exists in a predefined marker dictionary, and based on the bit value being found, outputting the recognized marker code, or based on the bit value not being found, determining that reference marker code is invalid.

9. The location tracking system of claim 6, wherein:

estimating the relative location by the image collecting device comprises:

generating a marker coordinate system for estimating the relative location based on an absolute coordinate and a marker direction of the reference marker, and wherein generating the marker coordinate system comprises:

determining coordinates of 4 vertices and lengths of 4 sides of a square border of the reference marker, and generating the marker coordinate system having an x axis and a y axis using a square edge of the reference marker, the x axis and the y axis being orthogonal at a center of a plane of the square, equal to two sides orthogonal to a z axis in a vertical direction from the center of the plane.

10. The location tracking system of claim 6, wherein:

the image collecting device is configured to:

store estimation results of continuously detected reference marker according to conditions set to correct an error occurring by a size of the reference marker and a degree of distortion, and correct an actual estimated location and a moving direction based on a moving direction of a point group of collection of points of stored coordinates.

11. The location tracking system of claim 6, wherein:

the image collecting device is configured to, based on the reference marker not being detected in the image data, estimate a current relative location by performing a Motion Estimation based on a last known relative location and an inertia value provided from the IMU.

12. The location tracking system of claim 1, wherein:

the target comprises at least one of a product vehicle that are assembled while moving by process along a conveyor system, a logistics robot that supplies necessary parts for each process, a moving truck for loading the parts, or a tool that is movable for each process.

13. The location tracking system of claim 12, wherein: the server is configured to determine facility devices for each process based on a model and specification of the vehicle and an estimated location, control an execution of process works, and receive and update a work result.

14. A location tracking method in a factory of an image collecting device attached to a tracking target for management, comprising:

collecting, by at least one camera, an image data of surroundings captured while moving;

deriving, by an Inertial Measurement Unit (IMU), an inertia value by measuring an acceleration and a moving direction;

detecting, by a location tracking unit, whether a reference marker disposed on a fixture in an area having absolute coordinates in the factory exists in the image data;

based on the reference marker being detected:

reading a geometric shape of the reference marker, recognizing an absolute location and a marker direction of the reference marker defined in advance, and estimating a relative location of the tracking target based on an absolute position and a marker direction of the reference marker;

transmitting a device ID and vehicle identification information to a server to thereby enable the server to (i) match and store the device ID and the vehicle identification information from the image collecting device, and initiate production management for the tracking target; and transmitting detachment information from the finished tracking target after use to the server so that the server (i) receives the detachment information from the image collecting device, (ii) cancels the matching between the device ID and the vehicle identification information of the tracking target, and (iii) ends production management for the tracking target.

15. The location tracking method of claim 14, wherein: detecting whether the reference marker exists comprises:

determining whether the reference markers are continuously and stably detected in accordance with conditions set in a plurality of image data, and based on a determination that the reference marker is not continuously and stably detected, determining a reference marker to be invalid and excluding the reference marker from an analysis.

16. The location tracking method of claim 15, wherein: the conditions determining that a continuous and stable detection is performed when:

in a state where a reference marker is detected by processing the plurality of image data in a same way, if all the conditions that marker codes of continuously detected reference markers are the same, a number of pixels occupying an area of the reference marker is greater than a specific value, and a change in a number of pixels continuously exists are satisfied.

17. The location tracking method of claim 14, further comprising:

based on a reference marker existing in the image data not being detected, estimating a current relative location by performing a Motion Estimation based on a last known relative location and the inertia value, after the detecting whether the reference marker exists.

18. The location tracking method of claim 14, further comprising:

transmitting a relative location information of the target to a server; and updating a tracking location of the target, after estimating the relative location.

19. The location tracking method of claim 18, wherein: the relative location information comprises at least one of a image collecting device, a marker code, a relative coordinate with respect to a reference marker, a moving direction, image data, or orientation data.

* * * * *